C. W. FELKER.
LAWN MOWER.
APPLICATION FILED DEC. 14, 1909.
1,000,393.
Patented Aug. 15, 1911.
2 SHEETS—SHEET 2.
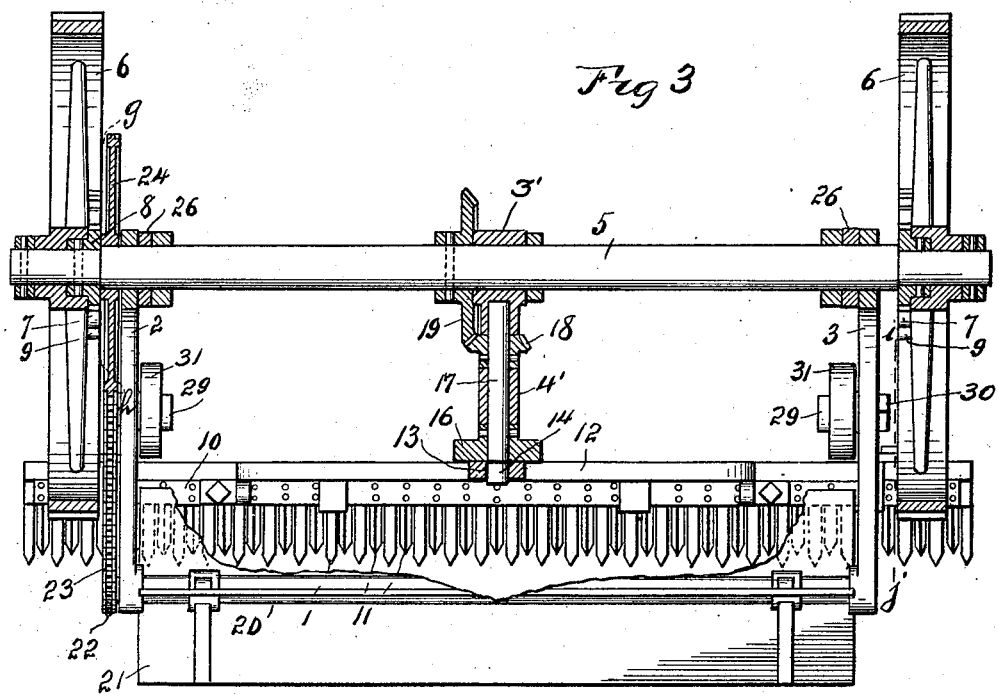
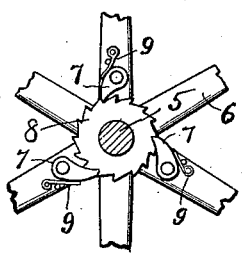
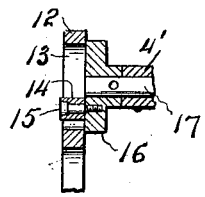
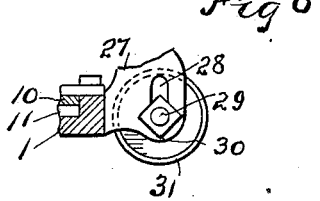
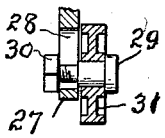
WITNESSES:
R. L. Hamilton
E. B. House
INVENTOR.
Charles W. Felker
BY
Warren D. House
His ATTORNEY.
COLUMBIA PLANOGRAPH CO., WASHINGTON, D. C.

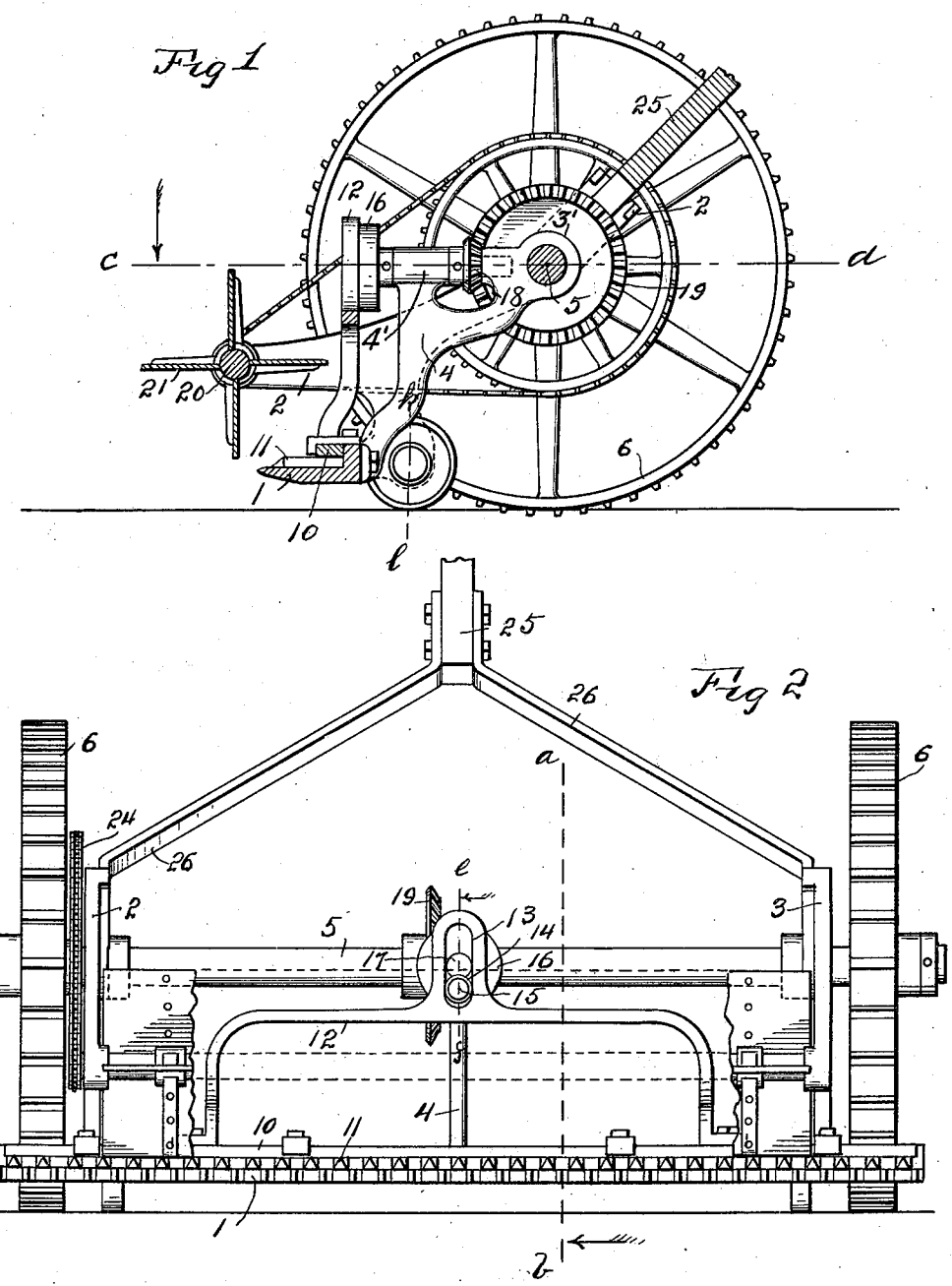

UNITED STATES PATENT OFFICE.

CHARLES W. FELKER, OF ARGENTINE, KANSAS, ASSIGNOR OF ONE-HALF TO ARTHUR FELKER, OF CLARENCE, MISSOURI.

LAWN-MOWER.

1,000,393.  Specification of Letters Patent.  Patented Aug. 15, 1911.

Application filed December 14, 1909. Serial No. 533,004.

*To all whom it may concern:*

Be it known that I, CHARLES W. FELKER, a citizen of the United States, residing at Argentine, in the county of Wyandotte and State of Kansas, have invented certain new and useful Improvements in Lawn-Mowers, of which the following is a specification.

My invention relates to improvements in lawn mowers.

The object of my invention is to provide a lawn mower which is, cheaply constructed, readily operated, and is not liable to get out of order.

The novel features of my invention are hereinafter fully described and claimed.

In the accompanying drawings illustrative of the preferred form of my invention, Figure 1 is a vertical section on the dotted line *a—b* of Fig. 2. Fig. 2 is an elevation partly broken away. Fig. 3 is a horizontal sectional view on the dotted line *c—d* of Fig. 1. Fig. 4 is a vertical section on the dotted line *e—f* of Fig. 2. Fig. 5 is a cross section on the dotted line *g—h* of Fig. 3. Fig. 6 is a vertical section on the dotted line *i—f* of Fig. 3. Fig. 7 is a vertical section on the dotted line *k—l* of Fig. 1.

Similar reference characters denote similar parts.

The frame comprises a horizontal finger bar 1 having secured to it upwardly extending end arms 2 and 3 and an intermediate arm 4 the upper end of which is bifurcated and is provided with two bearings 3′ and 4′ disposed one in front of the other.

5 denotes a horizontal axle rotatively mounted in the arms 2, and 3 and in the rear bearing 3′ of the arm 4 and having mounted rotatively on it two carrying wheels 6, each of which has pivoted to it one or more pawls 7 which engage ratchet wheels 8 secured to and rotative with the axle 5. Springs 9 secured to the wheels 6 normally force the pawls 7 into engagement with the ratchet wheels 8, the arrangement being such that forward rotation of the carrying wheels will rotate the axle.

Reciprocatively mounted on the finger bar 1 is a cutter bar 10 having teeth 11 which coöperate with the finger bar. The cutter bar is horizontally disposed and is reciprocated by the following described means. Secured to the cutter bar 10 is a vertical member 12 having a vertical slot 13 in which is mounted a crank device comprising preferably a friction roller 14 mounted on a horizontal crank pin 15 secured to the forward side of a crank disk 16 and disposed eccentrically to a horizontal shaft 17 to which the disk 16 is rigidly fastened. The shaft 17 is rotatively mounted, at right angles to the slot 13, in the two bearings 3′ and 4′ of the intermediate arm 4, and has secured rigidly to it between said bearings a bevel gear wheel 18 which meshes with a bevel gear wheel 19, which is rigidly secured to the axle 5. This arrangement affords a very rigid construction and eliminates danger of the frame being twisted so as to cramp the shaft 17 or sickle bar 10.

A fan comprising a horizontal shaft 20 having blades 21 which extend radially therefrom is rotatively mounted in the arms 2 and 3 in a position such that it will force the grass toward the cutter bar and also blow the cut grass rearwardly.

Secured rigidly to the shaft 20 is a sprocket wheel 22 on which is mounted a sprocket chain 23 which is also mounted on a sprocket wheel 24 secured rigidly to the axle 5.

25 denotes the handle secured to the arms 2 and 3 by the arms 26.

The cutter bar 10 and finger bar 1 preferably extend outside the carrying wheels 6, so that the grass may be cut close to a fence or building.

The finger bar 1 is provided with two rearwardly extending arms 27 each having a vertical slot 28. In the slots 28 are respectively mounted two horizontal bolts 29 which are shouldered and provided with nuts 30 by which the bolts may be rigidly secured in positions in which they may be adjusted in the slots 28. Rotative respectively on the bolts 29 are two wheels 31 which serve to support the finger bar at a desired distance from the ground.

When the machine is pushed forwardly by the handle 25, the axle will be rotated and the cutter bar reciprocated by the mechanism described. At the same time the fan will be rotated in a direction such that the grass will be forced to the cutter bar and then blown rearwardly. By vertically adjusting the bolts 29 the cutter bar 10 and finger bar 1 may be adjusted toward or from the ground.

Modifications of my invention, within the scope of the appended claim, may be made without departing from its spirit.

Having thus described my invention, what I claim and desire to secure by Letters Patent, is:—

In a lawn mower, the combination with a frame comprising a horizontal finger bar, two upwardly extending end arms secured to the finger bar, and an upwardly extending arm intermediate of the end arms and secured to the finger bar and having at its upper end two bearings in axial alinement, of a horizontal axle rotatively mounted in bearings in said end arms and in said intermediate arm, a shaft disposed at right angles to the axle and rotatively mounted in said first named two bearings, a gear wheel secured to the shaft intermediate of said two bearings, a gear wheel secured to the axle and meshing with the first named gear wheel, a cutter bar reciprocative on the finger bar, and means actuated by the said shaft for reciprocating the cutter bar.

In testimony whereof I have signed my name to this specification in presence of two subscribing witnesses.

CHARLES W. FELKER.

Witnesses:
E. B. HOUSE,
J. C. IRWIN.

Copies of this patent may be obtained for five cents each, by addressing the "Commissioner of Patents. Washington, D. C."